Patented Mar. 18, 1930

1,751,220

UNITED STATES PATENT OFFICE

ICHITARO SHOJI, OF HIGASHI YODOGAWA-KU, OSAKA, JAPAN, ASSIGNOR TO SANKYO KABUSHIKI KAISHA, OF TOKYO, JAPAN, A CORPORATION OF JAPAN

LIGHT FILTER

No Drawing. Application filed August 3, 1926, Serial No. 126,934, and in Japan December 24, 1925.

The present invention relates to a process of manufacturing a light filter which absorbs ultra-violet rays by making a thin layer of the hexamethylene-tetramine-triphenol on the surface of glass. The object of the invention is to manufacture a light filter for aerial, orthochromatic, and natural color photography and other optical purposes which does not permit the passage of ultra-violet rays by utilizing the property of said condensation product of absorbing ultra-violet rays, and also by the same theory to make a thin layer of said condensation product upon the surface of electric bulbs or glass wares to prevent the passage of ultra-violet rays and thus regulate the light of the former and prevent the change of the contents of the latter due to light. It is to obtain a light filtering plate of good effect by simple means and at a small cost.

I have studied the physical property of the hexamethylene-tetramine-triphenol and discovered that they absorb ultra-violet rays well, and especially that the condensation product made by using ammonia as condensation agent absorbs such rays still better, even if it be a thin layer, and lets all visible rays pass through except a part of the purple. I have discovered that if ammonia is used as a condensation agent, hexamethylene-tetramine-triphenol is produced in the condensation product, which renders it capable of absorbing violet rays perfectly.

To give an example of how ultra-violet rays are absorbed, upon experimenting the condensation product manufactured by my method described below on a spectro-photographic apparatus using quartz, I have found that an apparatus of 0.13 centimeter thick does not permit the passage of rays of the wave length of shorter than 470 millimicron; and also that of 0.08 centimeter thick, shorter than 465 millimicron.

In short, the condensation product of this invention in these thicknesses perfectly absorbs ultra-violet rays. Also, it having the property of easily mixing with coloring matters soluble in alcohol, it is possible to regulate the passage and absorption of visible rays by mixing it with such coloring matters. Further, this condensation product can be made either soluble or insoluble in alcohol by regulating the degree of condensation properly during its manufacture. Moreover, as it is possible to regulate its melting point at will, this property can be utilized to coat the surface of glass with the condensation product of this invention as alcohol solution or simply by melting it with heat.

The following is the manner of manufacturing a light filter according to my invention:—

Mix 50 grams of carbolic acid, 46 grams of formalin and 10 cubic centimeters of 10% ammonia water together and heat the mixture, stirring it up for a short time. Then, the viscous and light yellow first condensation product of oily state will be obtained. Again, heat it in an evaporating basin at a temperature lower than 100° C. while stirring it up. When it reaches the proper viscosity, pour a little quantity of it on a clean dry glass plate prepared beforehand, and before it cools, put another piece of glass plate thereon. Then, cool them under pressure, and there will be produced a thin layer of condensation product between them. Thus, a light filter which absorbs ultra-violet rays can be manufactured. If necessary, add the desired coloring matters as alcohol solution to the before-mentioned first condensation product of oily state when heated and stirred up, and thus making it absorb ultra-violet rays, the passage and absorption of visible rays can be regulated at will.

In order to manufacture electric bulbs or glass wares which do not let ultra-violet rays pass through, dissolve said first condensation product of oily condition in alcohol to the proper viscosity after heating and condensing it suitably. Then, coat an object with it and dry it, which, when heated and condensed at the temperature of approximately 100° C., will have a thin layer of said condensation product upon its surface and prevent ultra-violet rays from passing through it.

The above described examples all relate to the use of this condensation product together with glass plate. However, where hardness is not necessary, a condensation product in the form of a plate may be used alone as a light filter. The light filtering plates hitherto used for the above purpose in photography and other optical arts are made by utilizing the nature of a special kind of coloring matter of absorbing ultra-violet rays, dissolving it in a solvent such as gelatine or balsam and putting the solution between glass plates. Therefore, it is difficult to cut or grind them after manufacturing them.

According to this invention, however, as a condensation product tenacious enough at an ordinary temperature is utilized, the light filtering plate made thereof can be cut or ground at will after manufacture. In short, my invention has resulted in a remarkable improvement on the light filters hitherto known.

Claims:

1. A light filter capable of absorbing ultra violet rays, comprising a film containing hexamethylene-tetramine-triphenol obtained by condensing phenol and formaldehyde in the presence of ammonia.

2. A light filter capable of absorbing ultra violet rays, comprising a film containing hexamethylene-tetramine-triphenol obtained by condensing phenol and formaldehyde in the presence of ammonia, said film having a thickness of less than .25 mm.

In testimony whereof I have affixed my signature.

ICHITARO SHOJI.